(12) United States Patent
Noda

(10) Patent No.: US 7,274,515 B2
(45) Date of Patent: Sep. 25, 2007

(54) BIFOCUS LENS SYSTEM AND A PORTABLE MACHINE USING THE SAME

(75) Inventor: Sayuri Noda, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 0 days.

(21) Appl. No.: 11/358,750

(22) Filed: Feb. 21, 2006

(65) Prior Publication Data

US 2007/0115563 A1    May 24, 2007

(30) Foreign Application Priority Data

Nov. 24, 2005    (TW) ............................. 94141358 A

(51) Int. Cl.
*G02B 15/02*    (2006.01)
*G02B 13/02*    (2006.01)

(52) U.S. Cl. ...................... 359/672; 359/748
(58) Field of Classification Search ............... 359/748, 359/793–795
See application file for complete search history.

(56) References Cited

U.S. PATENT DOCUMENTS 5,329,400 A * 7/1994 Miyano ..................... 359/673

* cited by examiner

*Primary Examiner*—Ricky Mack
*Assistant Examiner*—William C Choi
(74) *Attorney, Agent, or Firm*—Charles E. Baxley

(57) ABSTRACT

A bifocus lens system that is particularly suitable for being used in the portable machine, which not only can improve the incident angle but also can ensure miniaturization. The bifocus lens system comprises: a first lens group, a second lens group at wide angle side, and a second lens group at telephoto side, wherein the focal length can be changed by selectively arranging either of the first lens group and the second lens group on optical axis. A focal length of the first lens group is f1, a focal length of the second lens group at wide angle side is fw, and they satisfy the relation as: 1.0<f1/fw<1.4. A focal length of the second lens group at telephoto side is f2t, a total focal length of the whole lens groups at telephoto side is ft, they satisfy the relation: 0.8<|f2t/ft|<2.3

8 Claims, 19 Drawing Sheets

(EMBODIMENT 1)

WIDE ANGLE SIDE

TELEPHOTO SIDE (EMBODIMENT 1)
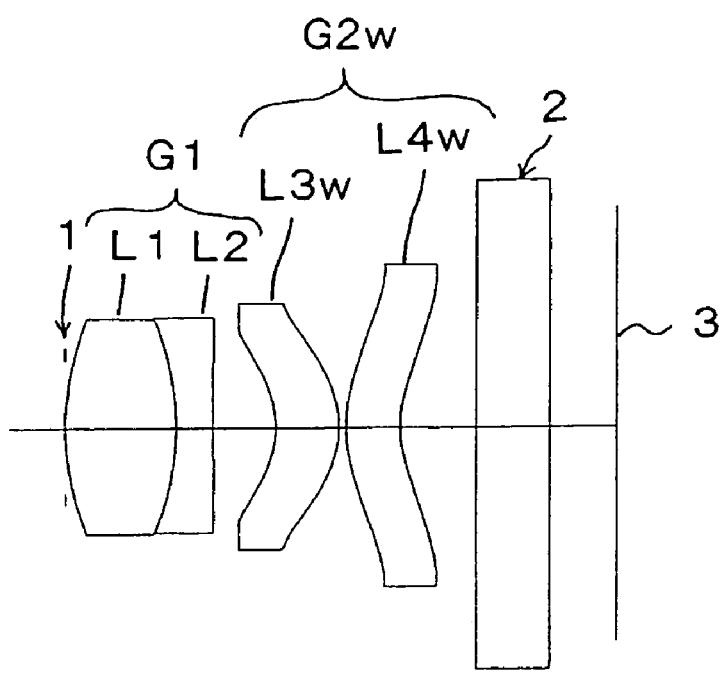
WIDE ANGLE SIDE
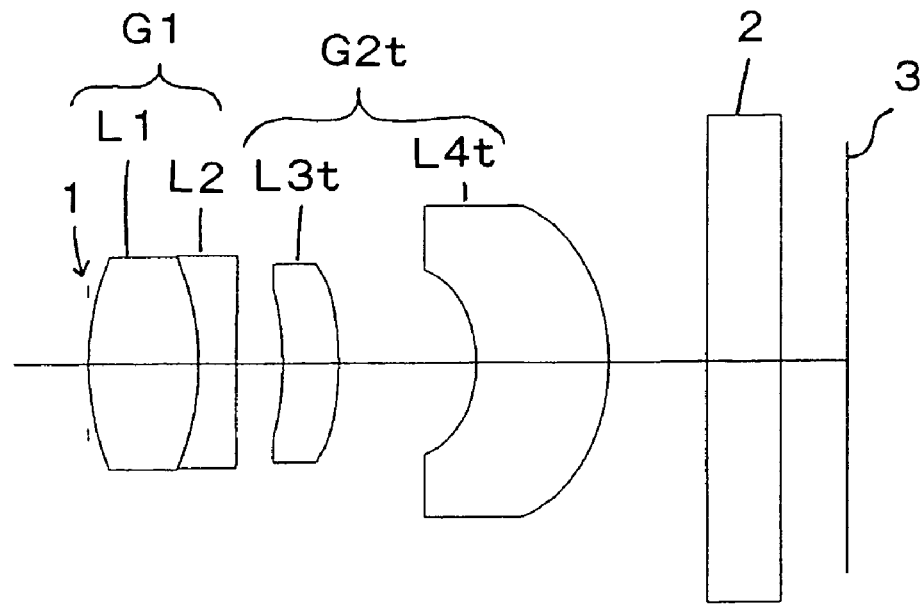
TELEPHOTO SIDE
FIG. 1A (EMBODIMENT 1)

FOCAL LENGTH : fw=4.00, ft = 7.63
F NO. : Fw = 2.80, Ft = 5.34
VIEW ANGLE : $2\omega w = 60.3°$, $2\omega t = 33.7°$

|   | r      | d    | nd      | $\nu$d |
|---|--------|------|---------|--------|
| S | ∞      | 0.00 |         |        |
| 1 | 3.034  | 1.18 | 1.74330 | 49.2   |
| 2 | -3.034 | 0.40 | 1.84666 | 23.8   |
| 3 | 40.572 | d3   |         |        |
| 4 | r4     | d4   | nd4     | $\nu$d4 |
| 5 | r5     | d5   |         |        |
| 6 | r6     | d6   | nd6     | $\nu$d6 |
| 7 | r7     | d7   |         |        |
| 8 | ∞      | 0.80 | 1.51680 | 64.2   |
| 9 | ∞      |      |         |        |

|       | fw = 4.00 | ft = 7.63 |
|-------|-----------|-----------|
| r4    | -1.007    | -3.312    |
| r5    | -1.052    | -3.346    |
| r6    | 1.436     | -1.465    |
| r7    | 1.238     | -2.382    |
| d3    | 0.70      | 0.49      |
| d4    | 0.69      | 0.60      |
| d5    | 0.08      | 1.49      |
| d6    | 0.60      | 1.45      |
| d7    | 0.80      | 1.04      |
| nd4   | 1.50914   | 1.50914   |
| nd6   | 1.50914   | 1.50914   |
| $\nu$d4 | 56.4    | 56.4      |
| $\nu$d6 | 56.4    | 56.4      | f1／fw= 1.249
|f2t／ft|= 2.206

FIG. 1B (EMBODIMENT 2)
WIDE ANGLE SIDE
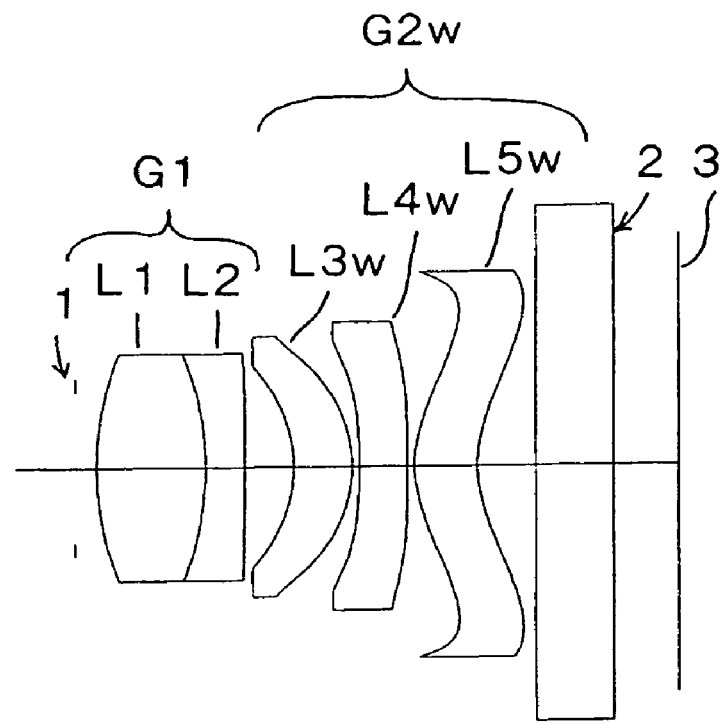
TELEPHOTO SIDE
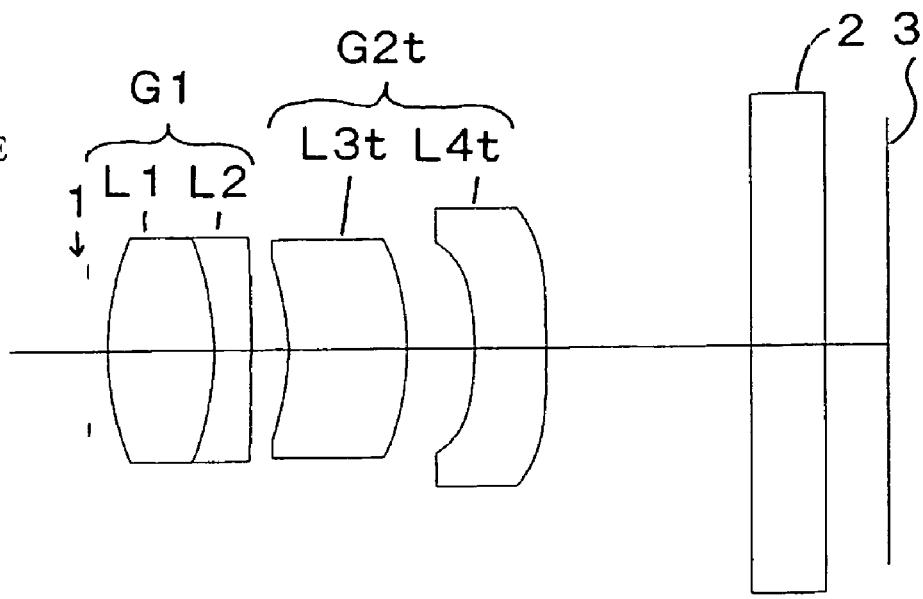
FIG. 2A (EMBODIMENT 2)

FOCAL LENGTH : fw=4.00, ft = 7.63
F NO. : Fw = 2.61, Ft = 4.99
VIEW ANGLE : 2ωw=61.0°, 2ωt = 34.5°

|    | r       | d    | nd      | νd   |
|----|---------|------|---------|------|
| S  | ∞       | 0.22 |         |      |
| 1  | 3.098   | 1.12 | 1.74330 | 49.2 |
| 2  | -3.098  | 0.40 | 1.84666 | 23.8 |
| 3  | -39.124 | d3   |         |      |
| 4  | r4      | d4   | nd4     | νd4  |
| 5  | r5      | d5   |         |      |
| 6  | r6      | d6   | nd6     | νd6  |
| 7  | r7      | d7   |         |      |
| 8  | r8      | d8   | nd8     | νd8  |
| 9  | r9      | d9   |         |      |
| 10 | ∞       | 0.80 | 1.51680 | 64.2 |
| 11 | ∞       |      |         |      |

|      | fw = 4.00 | ft = 7.63 |
|------|-----------|-----------|
| r4   | -1.260    | -2.312    |
| r5   | -1.366    | -2.628    |
| r6   | -5.545    | -3.333    |
| r7   | -60.141   | -23.065   |
| r8   | 1.204     | 0.000     |
| r9   | 1.387     | 0.000     |
| d3   | 0.50      | 0.40      |
| d4   | 0.61      | 1.26      |
| d5   | 0.08      | 0.71      |
| d6   | 0.50      | 0.77      |
| d7   | 0.07      | 2.19      |
| d8   | 0.66      | 0.00      |
| d9   | 0.60      | 0.00      |
| nd4  | 1.50914   | 1.50914   |
| nd6  | 1.58300   | 1.50914   |
| nd8  | 1.50914   | air       |
| νd4  | 56.4      | 56.4      |
| νd6  | 31.0      | 56.4      |
| νd8  | 56.4      | air       | f1/fw= 1.092
|f2t/ft|= 0.919

FIG. 2B (EMBODIMENT 2)
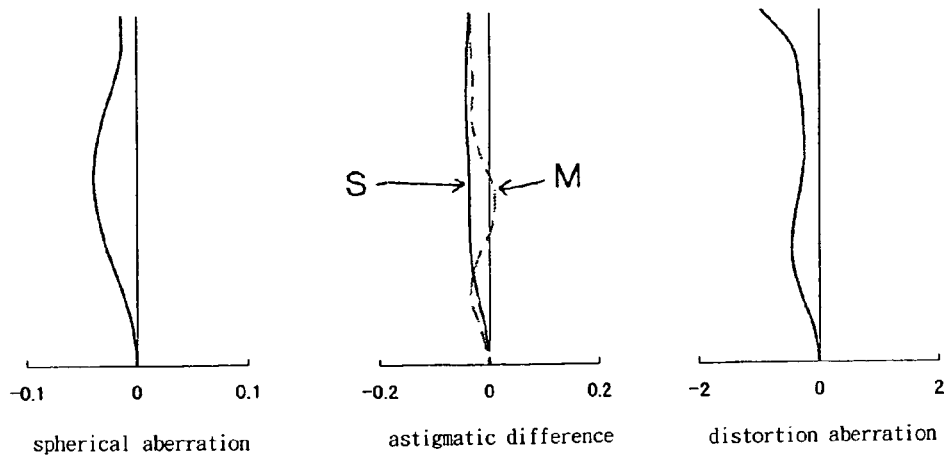
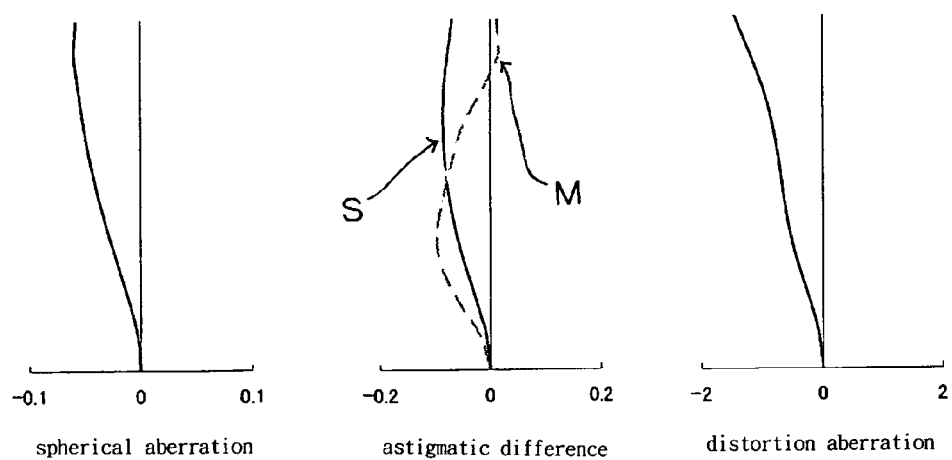
FIG. 2C (EMBODIMENT 3)
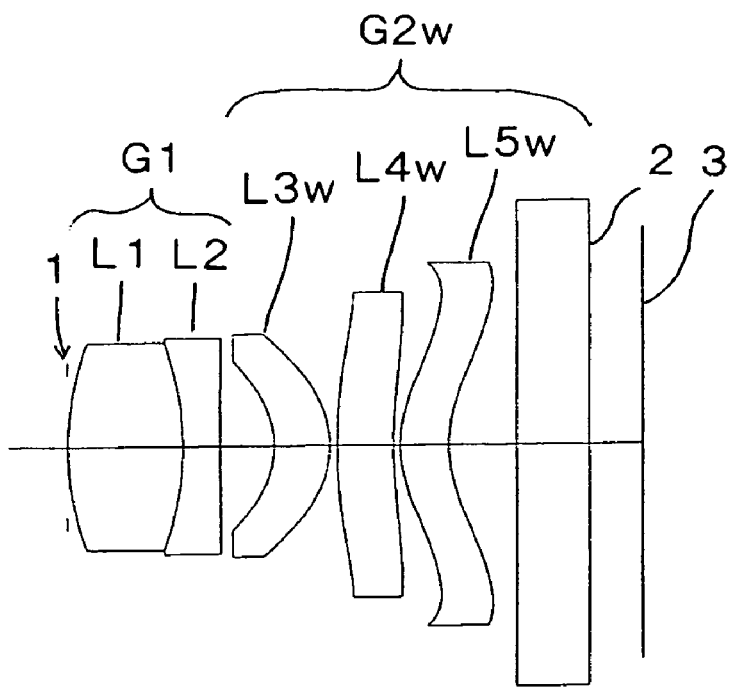
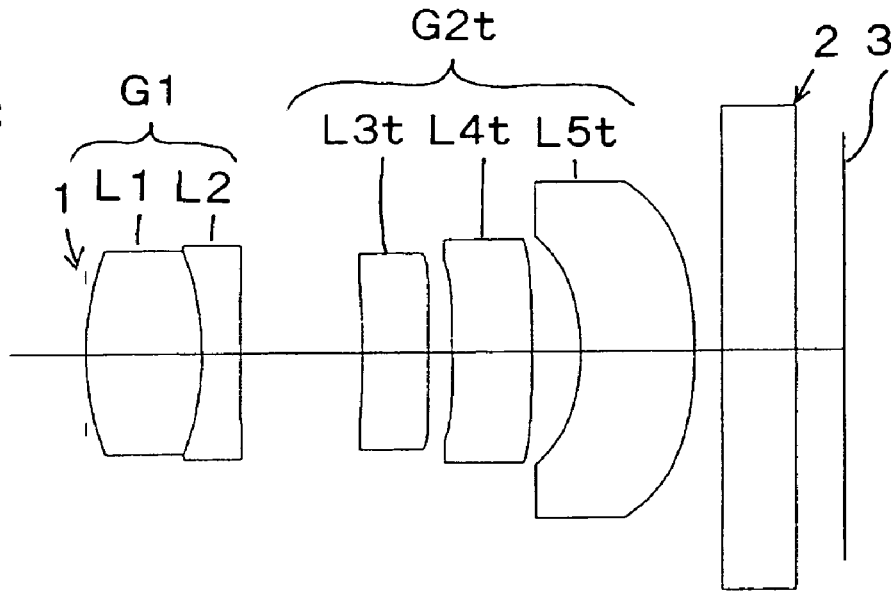
FIG. 3A (EMBODIMENT 3)

FOCAL LENGTH : fw=4.00, ft = 8.20
F NO. : Fw = 2.61, Ft = 5.36
VIEW ANGLE : 2ωw=60.9°, 2ωt = 32.3°

|   | r | d | nd | νd |
|---|---|---|---|---|
| S | ∞ | 0.00 | | |
| 1 | 3.223 | 1.27 | 1.74330 | 49.2 |
| 2 | -3.223 | 0.40 | 1.84666 | 23.8 |
| 3 | 46.140 | d3 | | |
| 4 | r4 | d4 | nd4 | νd4 |
| 5 | r5 | d5 | | |
| 6 | r6 | d6 | nd6 | νd6 |
| 7 | r7 | d7 | | |
| 8 | r8 | d8 | nd8 | νd8 |
| 9 | r9 | d9 | | |
| 10 | ∞ | 0.80 | 1.51680 | 64.2 |
| 11 | ∞ | | | |

|  | fw = 4.00 | ft = 8.20 |
|---|---|---|
| r4 | -0.931 | -7.346 |
| r5 | -1.055 | -28.884 |
| r6 | 4.897 | -20.613 |
| r7 | 4.728 | -21.432 |
| r8 | 1.331 | -2.370 |
| r9 | 1.354 | -4.674 |
| d3 | 0.59 | 1.35 |
| d4 | 0.60 | 0.72 |
| d5 | 0.07 | 0.26 |
| d6 | 0.63 | 0.86 |
| d7 | 0.08 | 0.54 |
| d8 | 0.53 | 1.26 |
| d9 | 0.75 | 0.30 |
| nd4 | 1.50914 | 1.50914 |
| nd6 | 1.50914 | 1.58300 |
| nd8 | 1.50914 | 1.50914 |
| νd4 | 56.4 | 56.4 |
| νd6 | 56.4 | 31.0 |
| νd8 | 56.4 | 56.4 | f1／fw= 1.320
|f2t／ft|= 0.853

FIG. 3B (EMBODIMENT 3)
WIDE ANGLE SIDE
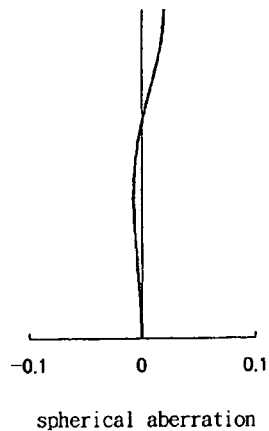
-0.1  0  0.1
spherical aberration
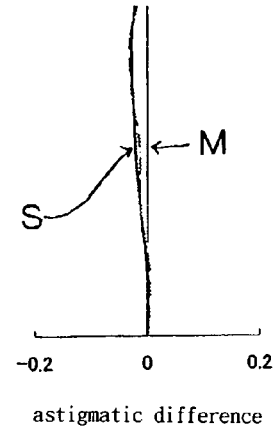
-0.2  0  0.2
astigmatic difference
-2  0  2
distortion aberration
TELEPHOTO SIDE
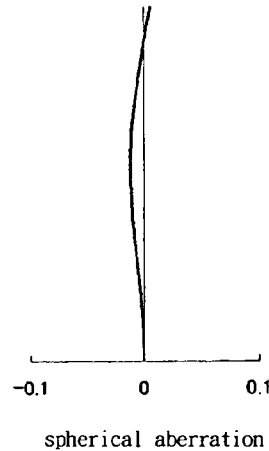
-0.1  0  0.1
spherical aberration
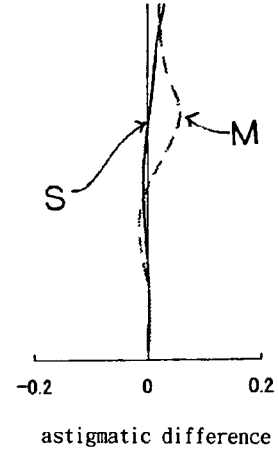
-0.2  0  0.2
astigmatic difference
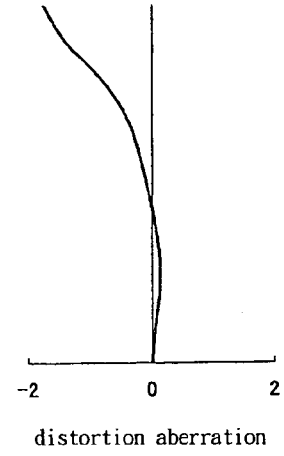
-2  0  2
distortion aberration
FIG. 3C (EMBODIMENT 4)
WIDE ANGLE SIDE
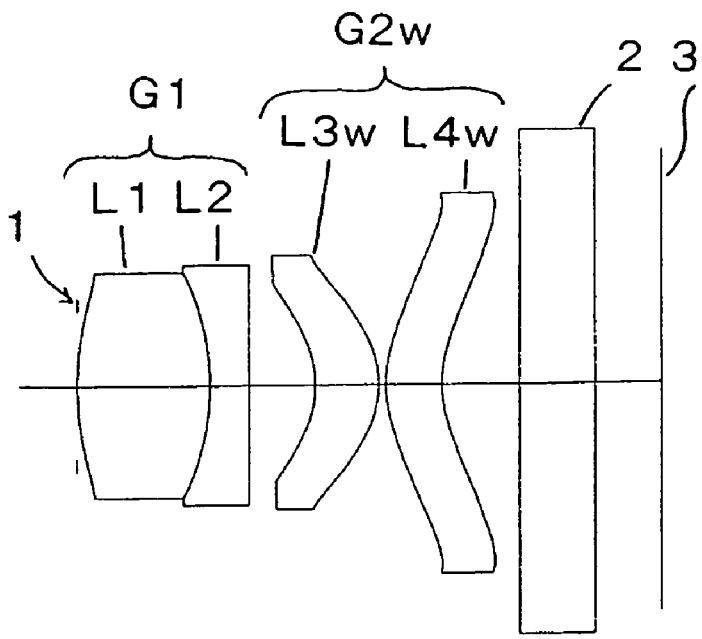
TELEPHOTO SIDE
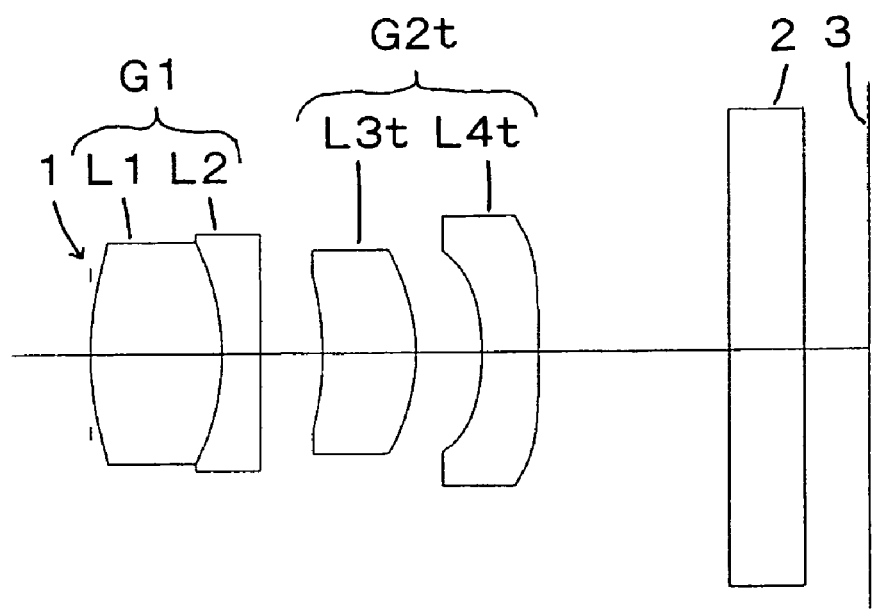
FIG. 4A (EMBODIMENT 4)

FOCAL LENGTH : fw = 3.94, ft = 7.64
F NO. : Fw = 2.59, Ft = 5.03
VIEW ANGLE : 2ωw = 61.5°, 2ωt = 34.2°

|   | r | d | nd | νd |
|---|---|---|---|---|
| S | ∞ | 0.00 | | |
| 1 | 3.400 | 1.39 | 1.74330 | 49.2 |
| 2 | -2.650 | 0.40 | 1.84666 | 23.8 |
| 3 | 500.000 | d3 | | |
| 4 | r4 | d4 | nd4 | νd4 |
| 5 | r5 | d5 | | |
| 6 | r6 | d6 | nd6 | νd6 |
| 7 | r7 | d7 | | |
| 8 | ∞ | 0.80 | 1.51680 | 64.2 |
| 9 | ∞ | | | |

|  | fw = 3.94 | ft = 7.64 |  |  |
|---|---|---|---|---|
| r4 | -1.014 | -2.855 | f1/fw = | 1.371 |
| r5 | -1.022 | -1.961 | \|f2t/ft\| = | 1.245 |
| r6 | 1.327 | -2.205 | | |
| r7 | 1.130 | -167.477 | | |
| d3 | 0.71 | 0.65 | | |
| d4 | 0.67 | 0.98 | | |
| d5 | 0.08 | 0.69 | | |
| d6 | 0.60 | 0.60 | | |
| d7 | 0.80 | 2.00 | | |
| nd4 | 1.50914 | 1.58300 | | |
| nd6 | 1.50914 | 1.50914 | | |
| νd4 | 56.4 | 31.0 | | |
| νd6 | 56.4 | 56.4 | | |

FIG. 4B (EMBODIMENT 4)
WIDE ANGLE SIDE
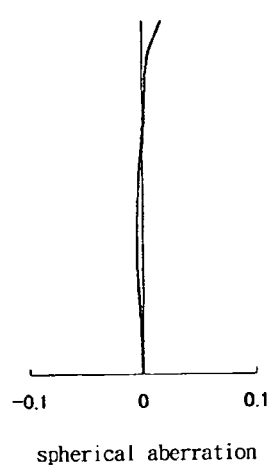
spherical aberration
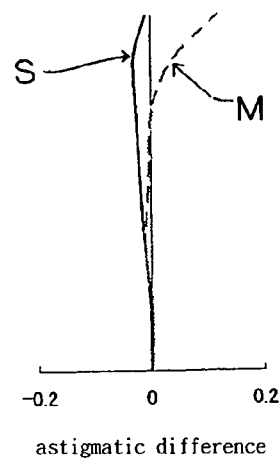
astigmatic difference
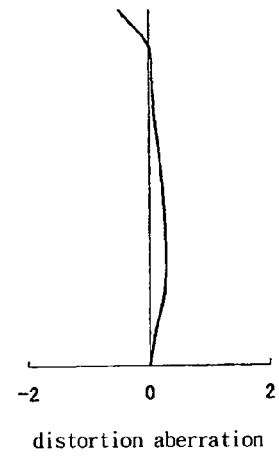
distortion aberration
TELEPHOTO SIDE
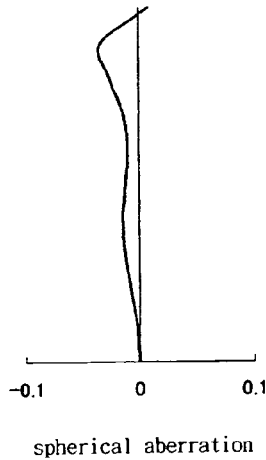
spherical aberration
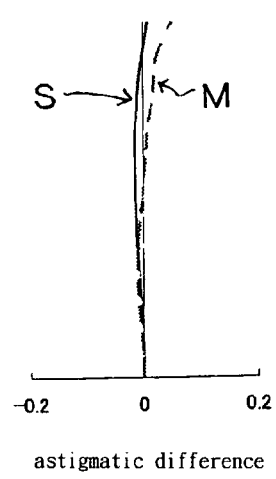
astigmatic difference
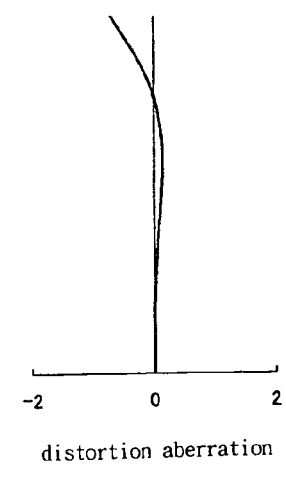
distortion aberration
FIG. 4C (EMBODIMENT 5)
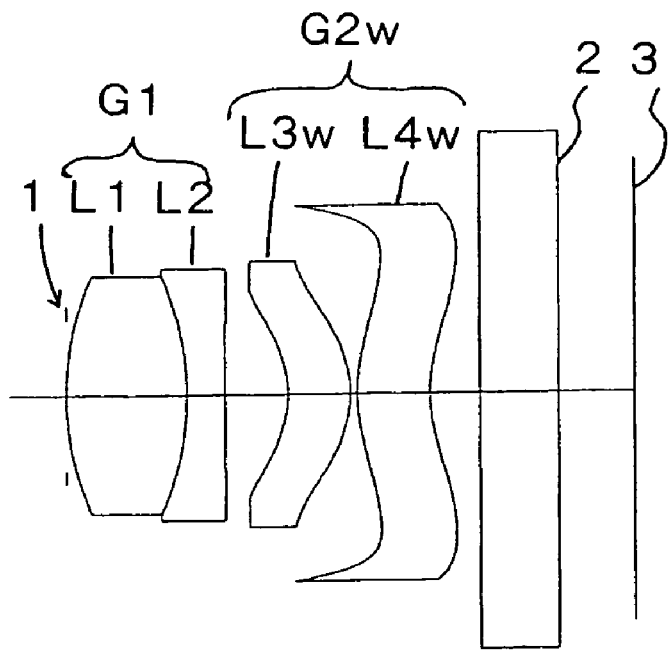
WIDE ANGLE SIDE
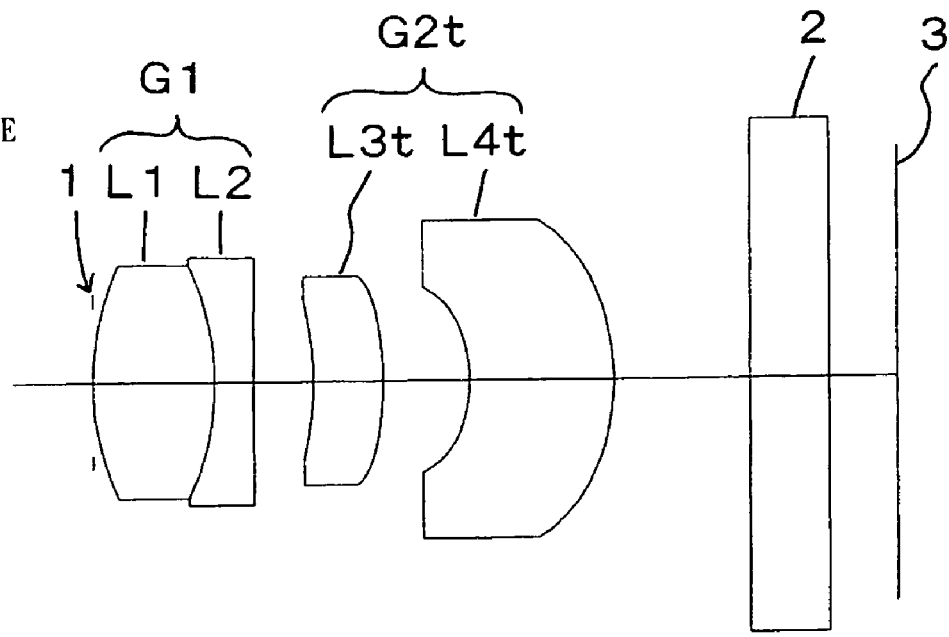
TELEPHOTO SIDE
FIG. 5A (EMBODIMENT 5)

FOCAL LENGTH : fw = 4.00, ft = 7.63
F NO. : Fw = 2.61, Ft = 4.99
VIEW ANGLE : $2\omega w = 60.9°$, $2\omega t = 34.0°$

|   | r | d | nd | νd |
|---|---|---|---|---|
| S | ∞ | 0.00 | | |
| 1 | 2.925 | 1.24 | 1.74330 | 49.2 |
| 2 | -2.925 | 0.40 | 1.84666 | 23.8 |
| 3 | 70.644 | d3 | | |
| 4 | r4 | d4 | nd4 | νd4 |
| 5 | r5 | d5 | | |
| 6 | r6 | d6 | nd6 | νd6 |
| 7 | r7 | d7 | | |
| 8 | ∞ | 0.80 | 1.51680 | 64.2 |
| 9 | ∞ | | | |

|   | fw = 4.00 | ft = 7.63 |
|---|---|---|
| r4 | -1.028 | -2.992 |
| r5 | -1.109 | -3.168 |
| r6 | 1.688 | -1.502 |
| r7 | 1.442 | -2.592 |
| d3 | 0.66 | 0.61 |
| d4 | 0.65 | 0.72 |
| d5 | 0.08 | 0.89 |
| d6 | 0.75 | 1.51 |
| d7 | 0.50 | 1.40 |
| nd4 | 1.50914 | 1.50914 |
| nd6 | 1.50914 | 1.50914 |
| νd4 | 56.4 | 56.4 |
| νd6 | 56.4 | 56.4 | f1/fw = 1.159
|f2t/ft| = 1.664

FIG. 5B (EMBODIMENT 1)
aspherical coefficient

| surface NO 4 | fw = 4.00 | ft = 7.63 | surface NO 5 | fw = 4.00 | ft = 7.63 |
|---|---|---|---|---|---|
| K | -5.51461E+00 | -4.14347E+01 | K | -2.57641E+00 | -5.67871E+00 |
| A | -2.64287E-01 | -1.07508E-01 | A | -6.44540E-02 | 4.43069E-03 |
| B | 1.77270E-01 | 1.41504E-01 | B | -4.92944E-02 | -7.88348E-02 |
| C | 6.09340E-02 | -2.14284E-01 | C | 1.04036E-01 | 6.08110E-02 |
| D | -8.56998E-02 | -1.28663E-02 | D | -6.71176E-02 | -8.63960E-02 |
| E | -4.46040E-03 | 7.22020E-01 | E | 4.50443E-02 | 1.26553E-01 |
| F | -1.34482E-02 | -1.28898E+00 | F | -2.20704E-02 | -1.46867E-01 |
| G | 3.68647E-02 | 7.17974E-01 | G | 4.36051E-03 | 6.49512E-02 |

| surface NO 6 | fw = 4.00 | ft = 7.63 | surface NO 7 | fw = 4.00 | ft = 7.63 |
|---|---|---|---|---|---|
| K | -4.10632E+00 | -2.02113E+00 | K | -5.56020E+00 | -2.92628E+00 |
| A | -3.03901E-02 | -1.01596E-01 | A | -2.12667E-02 | -2.99466E-02 |
| B | 7.86559E-03 | -9.43132E-02 | B | -1.84829E-03 | -7.43973E-03 |
| C | -7.60666E-04 | 6.97927E-03 | C | 1.67672E-03 | -2.94134E-04 |
| D | -2.87448E-04 | -2.02228E-02 | D | -1.77847E-04 | 6.19858E-04 |
| E | 2.81774E-05 | 1.61287E-02 | E | -1.46399E-04 | 2.05523E-04 |
| F | -9.39754E-06 | -2.96536E-02 | F | 2.94731E-05 | -2.66880E-04 |
| G | -1.11600E-07 | -1.49198E-02 | G | -1.46904E-06 | 4.32717E-05 |

(EMBODIMENT 2)
aspherical coefficient

| surface NO 4 | fw = 4.00 | ft = 7.63 | surface NO 5 | fw = 4.00 | ft = 7.63 |
|---|---|---|---|---|---|
| K | -8.41026E+00 | -1.84636E+01 | K | -1.31855E+00 | -7.86296E+00 |
| A | -2.68060E-01 | -1.14162E-01 | A | -3.95466E-02 | 1.18502E-02 |
| B | 1.62288E-01 | 1.65583E-01 | B | -9.98336E-02 | -5.50981E-02 |
| C | 1.91844E-02 | -1.35345E-01 | C | 1.13037E-01 | 7.15476E-02 |
| D | -1.24099E-01 | -7.56560E-03 | D | -7.02880E-02 | -9.73274E-02 |
| E | -2.06169E-02 | -2.15686E-02 | E | 3.90906E-02 | 4.09544E-02 |
| F | 1.08469E-01 | 2.29564E-01 | F | -2.49892E-02 | 2.06390E-02 |
| G | -3.97223E-02 | -1.66617E-01 | G | 8.03601E-03 | -1.44806E-02 |

| surface NO 6 | fw = 4.00 | ft = 7.63 | surface NO 7 | fw = 4.00 | ft = 7.63 |
|---|---|---|---|---|---|
| K | -5.23707E+01 | -3.25548E+01 | K | -1.56050E+04 | -9.09447E+02 |
| A | -7.49318E-02 | -1.06939E-01 | A | -5.54270E-02 | -4.47547E-02 |
| B | -8.87641E-03 | -2.32182E-02 | B | 2.83878E-03 | -8.56012E-03 |
| C | 2.26173E-03 | -3.52806E-03 | C | 2.14001E-03 | 5.45188E-05 |
| D | 2.71503E-03 | -1.16979E-02 | D | 5.19776E-04 | 3.44107E-04 |
| E | 1.27349E-03 | -1.73402E-02 | E | 2.81224E-05 | -5.83589E-05 |
| F | 1.69768E-04 | -9.06202E-03 | F | -2.06335E-05 | -3.03801E-04 |
| G | -2.05078E-04 | 1.45784E-02 | G | 1.29310E-05 | 1.54466E-04 |

| surface NO 8 | fw = 4.00 | ft = 7.63 | surface NO 9 | fw = 4.00 | ft = 7.63 |
|---|---|---|---|---|---|
| K | -1.79442E+00 | 0.00000E+00 | K | -2.72750E+00 | 0.00000E+00 |
| A | -9.16621E-02 | 0.00000E+00 | A | -1.74497E-02 | 0.00000E+00 |
| B | 3.31460E-02 | 0.00000E+00 | B | -9.06690E-03 | 0.00000E+00 |
| C | -1.19819E-02 | 0.00000E+00 | C | 2.13399E-03 | 0.00000E+00 |
| D | 2.13733E-03 | 0.00000E+00 | D | 5.09715E-05 | 0.00000E+00 |
| E | -2.16470E-04 | 0.00000E+00 | E | -1.36053E-04 | 0.00000E+00 |
| F | 7.80230E-05 | 0.00000E+00 | F | 2.35338E-05 | 0.00000E+00 |
| G | -2.15592E-05 | 0.00000E+00 | G | -1.97218E-06 | 0.00000E+00 |

FIG. 6

(EMBODIMENT 3)
aspherical coefficient

| surface NO 4 | fw = 4.00 | ft = 8.20 | surface NO 5 | fw = 4.00 | ft = 8.20 |
|---|---|---|---|---|---|
| K | -3.43196E+00 | -3.49039E+02 | K | -1.73614E+00 | 9.13421E+01 |
| A | -2.79807E-01 | -6.21747E-02 | A | -5.97757E-02 | 2.54936E-02 |
| B | 9.64861E-02 | 1.53370E-01 | B | -7.08816E-02 | -4.22920E-02 |
| C | 5.47433E-02 | -2.00026E-01 | C | 9.60271E-02 | 7.23287E-02 |
| D | -4.51376E-02 | 5.49508E-02 | D | -6.84498E-02 | -1.02743E-01 |
| E | -1.07013E-02 | 5.15210E-01 | E | 4.61423E-02 | 3.37585E-02 |
| F | 2.98474E-02 | -9.68836E-01 | F | -2.12188E-02 | 3.89204E-02 |
| G | -1.45623E-02 | 5.41720E-01 | G | 3.92898E-03 | -3.54782E-02 |

| surface NO 6 | fw = 4.00 | ft = 8.20 | surface NO 7 | fw = 4.00 | ft = 8.20 |
|---|---|---|---|---|---|
| K | -2.12538E+00 | -5.11291E+02 | K | -2.48966E+01 | -3.63779E+03 |
| A | -6.84478E-03 | -3.58763E-02 | A | -1.75220E-02 | -3.31942E-02 |
| B | -8.05927E-04 | -3.49050E-02 | B | 1.42217E-03 | -1.17648E-03 |
| C | -1.49510E-04 | 1.07115E-02 | C | 1.89700E-04 | 1.36487E-03 |
| D | 5.13018E-05 | 7.51286E-03 | D | -1.04735E-05 | 5.70739E-04 |
| E | -1.49527E-06 | -1.13136E-02 | E | -5.25785E-07 | -6.89690E-05 |
| F | -7.45906E-06 | -1.54810E-02 | F | 5.12446E-08 | -4.17535E-04 |
| G | -2.46093E-06 | 8.27839E-04 | G | -3.09484E-07 | 1.46840E-05 |

| surface NO 8 | fw = 4.00 | ft = 8.20 | surface NO 9 | fw = 4.00 | ft = 8.20 |
|---|---|---|---|---|---|
| K | -1.15923E+00 | 1.22260E+00 | K | -2.04132E+00 | 2.48893E+00 |
| A | -9.26480E-02 | -9.54521E-03 | A | -4.58782E-02 | -1.96268E-02 |
| B | 8.11878E-03 | -1.14065E-02 | B | -1.01923E-03 | -5.27909E-04 |
| C | 1.01591E-03 | -2.68368E-03 | C | 1.99882E-03 | -4.52168E-04 |
| D | -2.95647E-04 | -5.85187E-04 | D | -1.86111E-05 | -7.18005E-05 |
| E | 8.60305E-06 | 0.00000E+00 | E | -1.55088E-04 | 0.00000E+00 |
| F | -6.56306E-06 | 0.00000E+00 | F | 2.31133E-05 | 0.00000E+00 |
| G | -7.17340E-07 | 0.00000E+00 | G | -9.33813E-07 | 0.00000E+00 |

FIG. 7

(EMBODIMENT 4)
aspherical coefficient surface NO 1
- K   6.33207745
- A  −0.020432903
- B  −0.014382846
- C   0.018646163
- D  −0.022354529

| surface NO 4 | fw = 3.94 | ft = 7.64 | surface NO 5 | fw = 3.94 | ft = 7.64 |
|---|---|---|---|---|---|
| K | −4.96215E+00 | −3.27892E+01 | K | −1.84928E+00 | −4.04827E+00 |
| A | −2.44660E−01 | −1.13263E−01 | A | −3.90011E−02 | 4.84473E−03 |
| B | 1.32145E−01 | 1.72633E−01 | B | −6.77536E−02 | −5.01023E−02 |
| C | 4.92883E−02 | −1.06900E−01 | C | 9.85683E−02 | 8.06146E−02 |
| D | −5.00751E−02 | 5.11548E−03 | D | −6.49338E−02 | −9.09896E−02 |
| E | −8.29000E−03 | 5.68179E−02 | E | 4.63969E−02 | 3.71718E−02 |
| F | 2.09254E−02 | −1.94410E−01 | F | −2.19829E−02 | 6.67612E−03 |
| G | −9.16336E−03 | 1.70573E−02 | G | 4.17247E−03 | −7.10344E−03 |

| surface NO 6 | fw = 3.94 | ft = 7.64 | surface NO 7 | fw = 3.94 | ft = 7.64 |
|---|---|---|---|---|---|
| K | −3.61200E+00 | −8.92241E+00 | K | −4.31405E+00 | 0.00000E+00 |
| A | −2.37222E−02 | −1.10817E−01 | A | −2.13267E−02 | −4.27678E−02 |
| B | 6.90448E−03 | −2.48728E−02 | B | 2.49518E−04 | −9.67470E−03 |
| C | 4.08683E−05 | −6.35234E−03 | C | 1.79120E−03 | −1.22440E−04 |
| D | −3.17590E−04 | −1.36961E−02 | D | −1.64492E−04 | 3.29100E−04 |
| E | 7.68524E−06 | −1.78892E−02 | E | −1.57286E−04 | −2.70048E−05 |
| F | −7.21640E−06 | −8.18081E−03 | F | 2.64893E−05 | −2.61383E−04 |
| G | 1.53258E−06 | 1.63789E−02 | G | −5.76875E−07 | 1.85934E−04 |

(EMBODIMENT 5)
aspherical coefficient

| surface NO 4 | fw = 4.00 | ft = 7.63 | surface NO 5 | fw = 4.00 | ft = 7.63 |
|---|---|---|---|---|---|
| K | −5.30085E+00 | −3.41638E+01 | K | −2.15381E+00 | −1.25123E+01 |
| A | −2.26794E−01 | −9.45144E−02 | A | −3.01792E−02 | 9.30965E−03 |
| B | 1.32122E−01 | 1.65127E−01 | B | −6.31614E−02 | −7.37804E−02 |
| C | 5.89012E−02 | −2.06798E−01 | C | 1.01216E−01 | 6.92818E−02 |
| D | −3.91140E−02 | 2.20730E−01 | D | −6.36196E−02 | −9.56659E−02 |
| E | −6.66601E−03 | −4.05190E−01 | E | 4.69309E−02 | 3.04731E−02 |
| F | 4.40377E−03 | 4.82724E−01 | F | −2.21271E−02 | 8.15335E−03 |
| G | −1.06545E−03 | −1.29534E−01 | G | 3.72153E−03 | −6.15367E−03 |

| surface NO 6 | fw = 4.00 | ft = 7.63 | surface NO 7 | fw = 4.00 | ft = 7.63 |
|---|---|---|---|---|---|
| K | −4.58996E+00 | −2.35370E+00 | K | −5.67420E+00 | −3.19480E+00 |
| A | −5.53597E−02 | −9.28107E−02 | A | −4.10223E−02 | −2.74606E−02 |
| B | 9.11350E−03 | −1.00947E−01 | B | 5.88134E−04 | −6.13694E−03 |
| C | 1.22544E−04 | 5.28583E−03 | C | 1.66000E−03 | −3.06048E−04 |
| D | −3.72414E−04 | 3.97360E−03 | D | −1.78587E−04 | 5.16864E−04 |
| E | −2.93874E−05 | −3.70263E−02 | E | −1.60256E−04 | 1.58422E−04 |
| F | −3.07668E−05 | −4.42493E−02 | F | 2.54861E−05 | −2.73560E−04 |
| G | −1.17335E−05 | −1.66904E−02 | G | −1.08784E−06 | 5.32516E−05 |

FIG. 8

(EMBODIMENT 1)
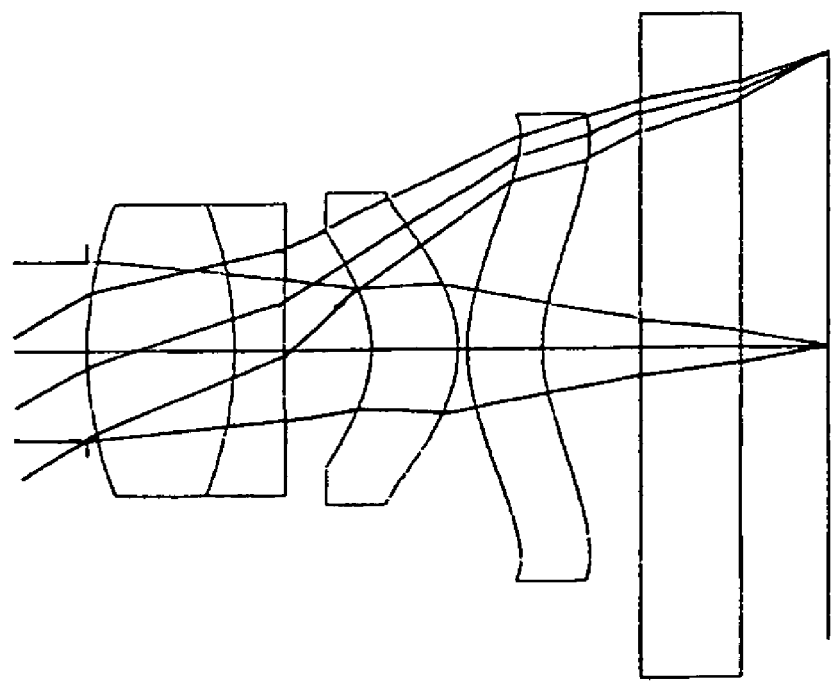
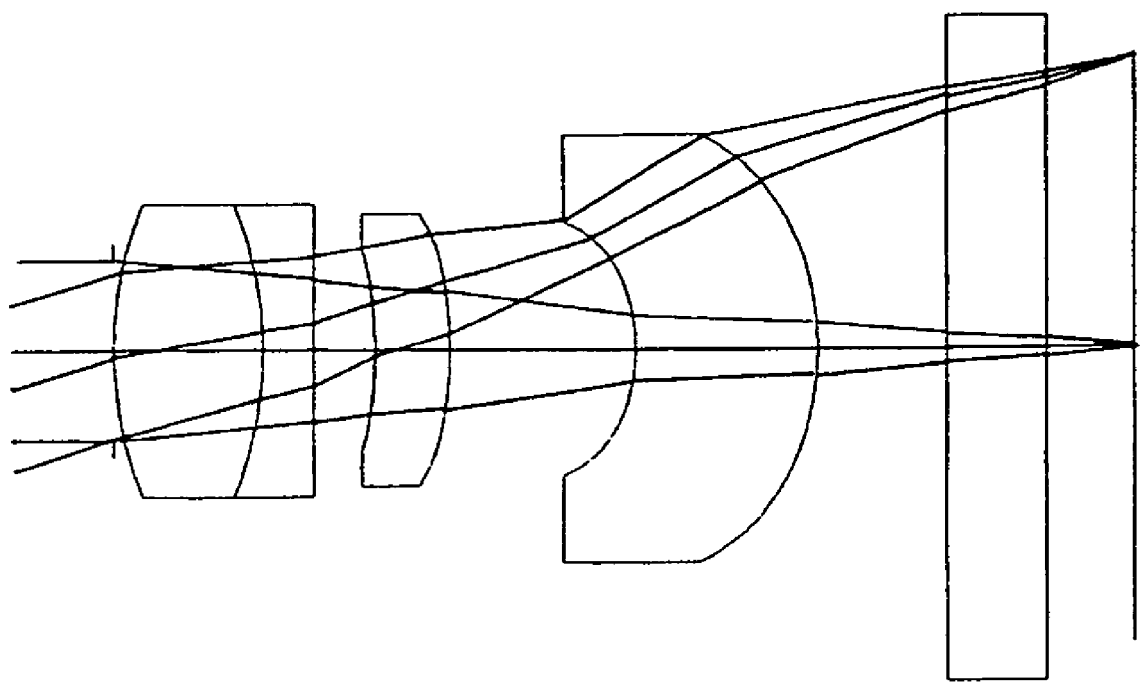
FIG. 9

BIFOCUS LENS SYSTEM AND A PORTABLE MACHINE USING THE SAME

BACKGROUND OF THE INVENTION

1. Field of the Invention

The present invention relates to a bifocus lens system capable of switching the focal length at the wide angle side and the telephoto side thereof and, and a portable machine using the same.

2. Description of the Prior Art

In recent years, it is becoming more and more common that a mobile phone (one example of the portable machine) is equipped with a device having image taking function. The portable machine perform imaging taking operation by the use of image taking lens assembly (optical system) and CCD (image sensor). Meanwhile, the image taking lens assembly no longer only has a single focus but must have an optical zoom function. However, the optical zoom contradicts the miniaturization of the portable machine. In addition, there will be many problems to be solved in terms of lens driving and cost.

Hereon, the present invention is not optical zoom but a bifocus lens system that is capable of switching the wide angle side and the telephoto side according to the focal length. The following are some citations regarding conventional art of the optical system for switching and replacing the focal length.

For example, JP Pat. No. 8122637 discloses an assistant lens, and JP Pat. No. 7318803 discloses a back surface switching lens, since it has an arbitrarily switchable device located at the image side of the chief lens system. However, it not only needs to arrange the assistant lens at the image side, but also has to use the CCD sensor, this makes it difficult to control the incident angle of the image side. Furthermore, the installation of assistant lens at the object side of the chief lens system is also of a known technology. However, in such condition, since the installation of the assistant lens increases the size of the lens, therefore, it is not ideal for the structure of a portable machine.

In addition, JP Pat. Nos. 5150192 and 720367 disclose an optical system that has a back surface switching lens disposed on the optical axis at the image side of the optical system, and such arrangement is of no help in improving the incident angle of the image side. Moreover, JP Pat. Nos. 6201993 and 7281092 disclose an optical system whose focal length is switched by a lens moveable along the optical axis. However, this condition should ensure a distance for the movable lens group, as a result, the total length of the optical system will have a problem. Therefore it is not suitable for the portable machine.

The present invention has arisen to mitigate and/or obviate the afore-described disadvantages.

SUMMARY OF THE INVENTION

To solve the aforementioned problems, the present invention provides a bifocus lens system that is particularly suitable for being used in the portable machine, which not only can improve the indent angle but also can ensure miniaturization.

To solve the abovementioned problems, the present invention provides a bifocus lens system that comprises a first lens group, a second lens group at wide angle side, and a second lens group at telephoto side. The focal length can be switched by selectively arranging either of the first lens group and the second lens group on optical axis, thus forming a bifocus lens assembly.

To the chief lens system, this lens system is not an assistant lens assembly or back surface switching lens, and the focal length is changed by switching a part of the second lens groups of the chief lens system. That is, the chief lens system comprises the first lens group and two lens groups of the second lens group. The chief lens system at wide angle side comprises the first lens group and the second lens group of wide angle side, and the chief lens system at telephoto side comprises the first lens group and the second lens group of telephoto side. The total length of the lens system can be reduced by replacing a part of the configuration of the chief lens system, furthermore, the changing of the second lens group at the image side of the lens system can effectively correct the incident angle at the image side. The consequence is that: the bifocus lens system not only can be miniaturized but also can ensure the incident angle of the image side.

The second lens group preferably has at least one aspherical surface.

The aspherical surface may correct the incident angle of the image side to the best.

At least one lens of the second lens group is preferably made of plastic material, since the use of plastic lens contributes to saving cost and can facilitate forming of the aspherical surface.

The first lens group preferably has at least a positive lens and a negative lens, because such configuration can effectively correct the chromatic aberration produced by the first lens group.

In this invention, the focal length of the first lens group is f1, the second lens group at wide angle side is fw, and they satisfy the relation as: $1.0 < f1/fw < 1.4$.

When $f1/fw \leq 1.0$, since the refractive power of the first lens group becomes strong, the sensitivity to eccentricity will be heightened. Since it is necessary to replace the eccentricity-caused sensitivity of the first lens group and the second lens group should be decreased as low as possible during the lens design stage.

When $f1/fw \geq 1.4$, the refractive power of the second lens group G12 will be increased, and the chromatic aberration will also be worsened.

In this invention, the focal length of the second lens group at telephoto side is f2t, and the total focal length of the whole lens groups at telephoto side is ft, they satisfy the relation: $0.8 < |f2t/ft| < 2.3$.

When $|f2t/ft| \leq 0.8$, since the refractive power of the second lens group becomes strong, when it is switched to the telephoto side, the chromatic aberration will be deteriorated. Furthermore, if plastic lenses are used in the second lens group, the second lens group will become sensitive to the temperature changes.

When $|f2t/ft| \geq 2.3$, the refractive power of the first lens group becomes strong, the spherical aberration and the comatic aberration will be worsened.

The present invention will become more obvious from the following description when taken in connection with the accompanying drawings, which show, for purpose of illustrations only, the preferred embodiments in accordance with the present invention.

BRIEF DESCRIPTION OF THE DRAWINGS

FIG. 1A is an illustrative view of showing the configuration of a four-piece lens assembly in accordance with a first embodiment the present invention;

FIG. 1B shows the optical data of the first embodiment the present invention;

FIG. 2A is an illustrative view of showing the configuration of a four-piece lens assembly in accordance with a second embodiment the present invention;

FIG. 2B shows the optical data of the second embodiment the present invention;

FIG. 2C shows the aberration correction of the second embodiment the present invention;

FIG. 3A is an illustrative view of showing the configuration of a four-piece lens assembly in accordance with a third embodiment the present invention;

FIG. 3B shows the optical data of the third embodiment the present invention;

FIG. 3C shows the aberration correction of the third embodiment the present invention;

FIG. 4A is an illustrative view of showing the configuration of a four-piece lens assembly in accordance with a fourth embodiment the present invention;

FIG. 4B shows the optical data of the fourth embodiment the present invention;

FIG. 4C shows the aberration correction of the fourth embodiment the present invention;

FIG. 5A is an illustrative view of showing the configuration of a four-piece lens assembly in accordance with a fifth embodiment the present invention;

FIG. 5B shows the optical data of the fifth embodiment the present invention;

FIG. 6 shows the data of the aspherical surface of the lenses assembly in accordance with the embodiments 1-2;

FIG. 7 shows the data of the aspherical surface of the lenses assembly in accordance with the third embodiment;

FIG. 8 shows the data of the aspherical surface of the lenses assembly in accordance with the embodiments 4 and 5; and FIG. 9 is an illustrative view of showing the incident ray of the first embodiment.

DETAILED DESCRIPTION OF THE PREFERRED EMBODIMENTS

Figure 1C:
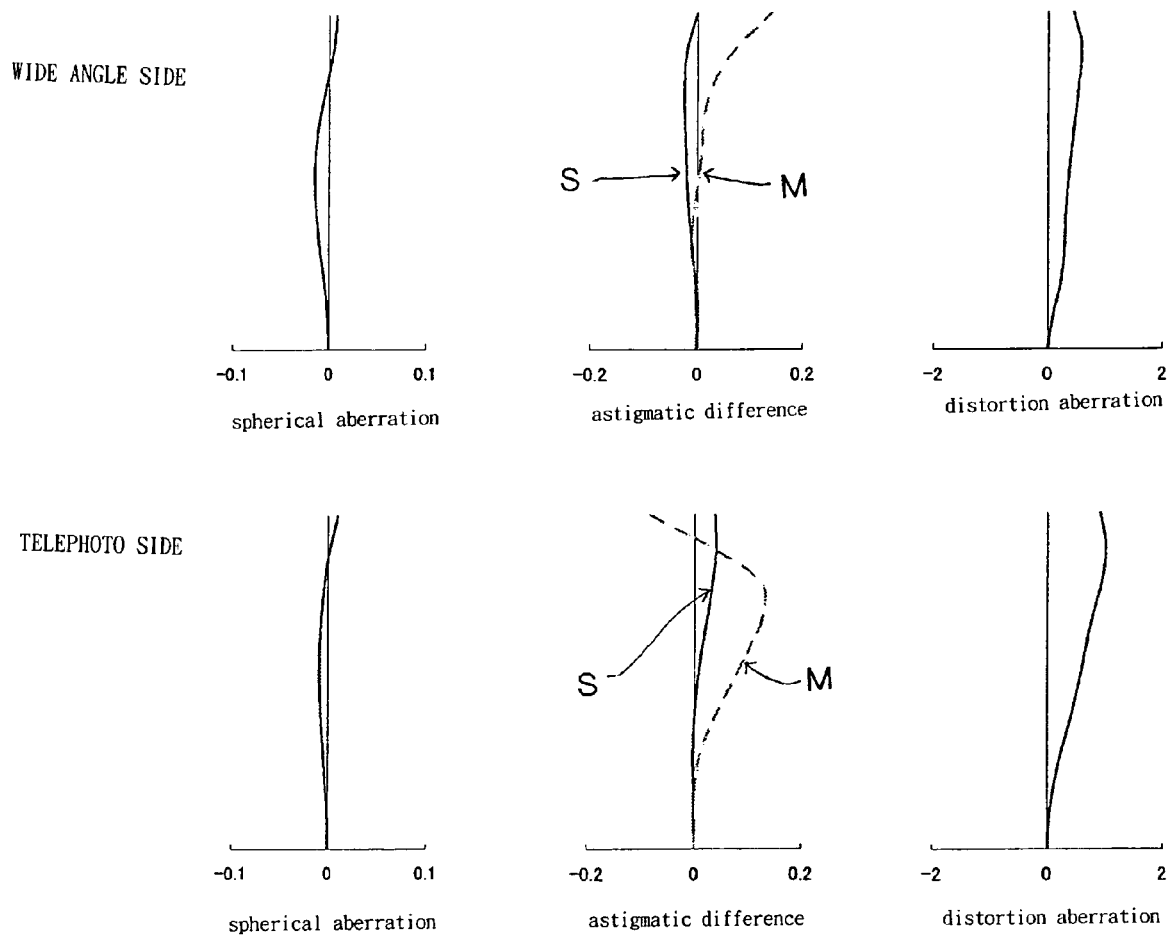
FIG. 1C shows the aberration correction of the first embodiment the present invention.
Figure 5C:
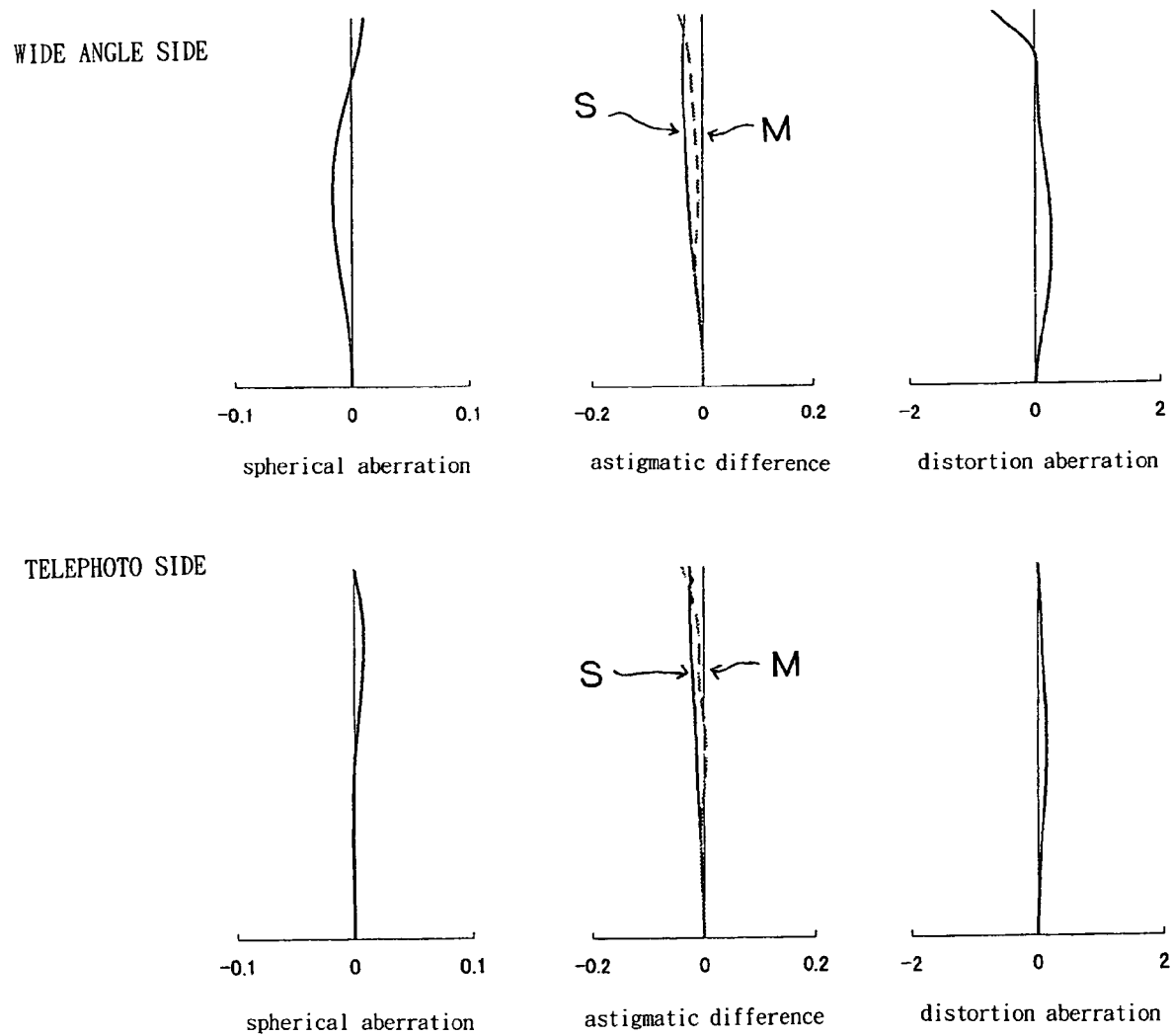
FIG. 5C shows the aberration correction of the fifth embodiment the present invention.

The foregoing, and additional objects, features and advantages of the present invention will become apparent from the following detailed description of preferred embodiments thereof, taken in conjunction with the accompanying drawings, in which, FIGS. 1A-5A show the configuration of a lens system in accordance with the embodiments 1-5 of the present invention, FIGS. 1B-5B show the optical data of the embodiments 1-5 of the present invention, FIGS. 1C-5C show the aberration correction of the embodiments 1-5 of the present invention, and FIGS. 6-8 are diagrams for showing the data of the aspherical surface of the lenses in accordance with the embodiments 1-5. The bifocus lens system of the present invention, as portable machine, is very suitable for forming the optical system hidden in the mobile phone.

FIGS. 1A-5A show different arrangements of the optical systems, one arrangement is that the lenses are arranged at wide angle side, and the other arrangement is that the lenses are disposed at telephoto side. The bifocus lens system of the first embodiment is arranged at wide angle side and comprises, successively from the object side along the optical axis: an aperture 1, a first lens L1, a second lens L2, a third lens L3w, a fourth lens L4w, a flat parallel glass 2, and an image plane 3. The first lens L1, and the second lens L2 constitute a first lens group G1, and the third and forth lenses L3w, L4w constitute a second lens group G2w. The first lens group G1 is disposed either at wide angle side or the telephoto side.

If the bifocus lens system 1, the second lens group G2w at wide angle side and the second lens group G2t at telephoto side can replace each other. The second lens group G2t at telephoto side is formed by the third lens L3t and the fourth lens L4t, namely, either of the second lens group G2w at wide angle side or the second lens group G2t at telephoto side can be used selectively. In addition, w represents the wide angle side and t represents the telephoto side.

The number of the second lens group of the first embodiment is the same as that of the fourth embodiment. In the second embodiment, the second lens group G2w at wide angle side includes three lenses, and the second lens group G2t at telephoto side includes two lenses, the fifth embodiment is the same as the second embodiment. Each of the second lens groups of the third embodiment at wide angle side and the telephoto side includes three lenses.

In the respective embodiments, the first lens group G1, successively from the object side, comprises positive lens and negative lens, such configuration can effectively correct the chromatic aberration produced in the first lens group G1. Moreover, the first lens group G1 of all the embodiments has two lenses. However, it also can be made up of three lenses if wanting to improve the resolution of the CCD.

The second lens group G2w, G2t preferably has at least one aspherical surface, because the formation of the aspherical surface can perform an effective correction to the incident angle of the image side, thus suppressing the total length of the optical system. Besides, in all the embodiments, all the surfaces of the second lens group G2w, G2t are aspherical. Meanwhile, at least one lens of the second lens group G2w, G2t is made of plastic material, since the use of plastic lens contributes to saving cost. Besides, in all the embodiments, all the surfaces of the second lens group G2w, G2t are aspherical, and all the lenses are preferably made of plastic material.

The flat parallel glass 2 has IR (infrared) cut filter function, and on the image plane 3 is arranged image reading device, such as CCD, etc.

Referring to FIGS. 1B-5B, which illustrate the elements of the lens system of respective embodiments, and the aberration correction data thereof. At the top of the figures are shown the various factors of the lens assembly, including focal length f, F Number, angle of view 2 ω. These data are different from the wide angle side to the telephoto side, so they are differentiated by adding "w" and "t". The data symbols in the following tables are explained as follows: S, 1, 2 . . . 9 represent the sequence numbers of the surfaces of the respective lenses from the object side (but S represents the aperture). Due to the first lens L1 and the second lens L2 contacts each other, the surface No 2 is the common surface of the lenses L1 and L2. r represents the paraxial radius (mm) of curvature. The surface Nos 8 and 9 are two sides of the flat parallel glass, therefore both of them are ∞, d represents surface separation (mm), nd represents the refractive index of the respective lenses and the flat parallel glass, and vd represents aberration coefficient of the respective lenses and the flat parallel glass.

In the first embodiment, the radius of curvature r, the surface separation d, the refractive index nd, and the aberration coefficient vd of the second lens group G2w at wide angle side are different from those of second lens group G2t at telephoto side, therefore, they are listed separately. Furthermore, the focal length of the first lens group G1 is indicated by f1, and the focal length of the second lens group G2t at telephoto side is indicated by f2t.

FIGS. 1C-5C show the aberration correction of the embodiments 1-5 of the present invention, The aberration correction diagrams include spherical aberration, astigmatic difference and distortion aberration, and are all about data of the line d. The astigmatic difference is the data of the sagittal image surface and the meridional.

The aspherical shape is illustrated in of FIGS. 6-8 explained as follows. The coefficients of the aspherical shape are indicated by A, B, C, D, E and F. The height H of the optical axis, and the deflection X of the optical axis are used as surface apex benchmark. The present invention can satisfy the following equation:

$$X=(1/R)H^2/[1+\{1-(1+K)(H/R)^2\}^{1/2}]+AH^4+BH^6+CH^8+DH^{10}+EH^{12}+FH^{14}+GH^{16}$$

wherein R represents the paraxial radius of curvature, K represents the conical coefficients, E represents the aspherical coefficient, and E-03 represents $10^{-3}$.

In this invention, the focal length of the first lens group G1 is f1, the second lens group G2w at wide angle side is fw, and they satisfy the relation as: 1.0<f1/fw<1.4.

When f1/fw≦1.0, since the refractive power of the first lens group G1 becomes strong, the sensitivity to eccentricity will be heightened. Since it is necessary to replace the configuration of the second lens group G2, the eccentricity-caused sensitivity of the first lens group G1 and the second lens group G2 should be decreased as low as possible during the lens design stage.

When f1/fw≧1.4, the refractive power of the second lens group G12 will be increased, and the chromatic aberration will also be worsened.

In this invention, the focal length of the second lens group at telephoto side is f2t, and the total focal length of the whole lens groups at telephoto side is ft, they satisfy the relation: 0.8<|f2t/ft |<2.3.

When f2t/ft|≦0.8, since the refractive power of the second lens group G2t becomes strong, when it is switched to the telephoto side, the chromatic aberration will be deteriorated. Furthermore, if plastic lenses are used in the second lens group G2t, the second lens group will become sensitive to the temperature changes.

When |f2t/ft|≧2.3, the refractive power of the first lens group becomes strong, the spherical aberration and the comatic aberration will be worsened. The abovementioned are summarized in table 1

TABLE 1

|  | f1/fw | f2t/ft |
| --- | --- | --- |
| Embodiment 1 | 1.249 | 2.206 |
| Embodiment 2 | 1.092 | 0.919 |
| Embodiment 3 | 1.32 | 0.853 |
| Embodiment 4 | 1.371 | 1.245 |
| Embodiment 5 | 1.159 | 1.664 |

Regarding the embodiments 1-5, the summation of data of d (the surface separation) is the total length of the lens system (however, the portion of the flat parallel glass is calculated by converting the air space into distance), and the total length is shown in table 2:

TABLE 2

| | Total length | |
| --- | --- | --- |
| | wide angle side | telephoto side |
| Embodiment 1 | 5.67 | 7.86 |
| Embodiment 2 | 5.97 | 8.29 |
| Embodiment 3 | 6.13 | 8.17 |
| Embodiment 4 | 5.86 | 7.94 |
| Embodiment 5 | 5.49 | 7.99 |

Table 2

It is understood from the table 2 that the lens system either at wide angle side or the telephoto side is suitable for being used in the mobile phone.

TABLE 3

| Embodiment 1 | wide angle side | 20.9° |
| --- | --- | --- |
| | telephoto side | 15.7° |
| Embodiment 2 | wide angle side | 21.0° |
| | telephoto side | 18.3° |
| Embodiment 3 | wide angle side | 21.7° |
| | telephoto side | 16.8° |
| Embodiment 4 | wide angle side | 20.5° |
| | telephoto side | 21.3° |
| Embodiment 5 | wide angle side | 20.9° |
| | telephoto side | 16.1° |

Table 3 show the incident angle of the chief ray projected from the peripheral-most of the image height onto the image plane, as illustrated in FIG. 9. If using CCD, the corresponding incident angle is preferably controlled below 25°, and the incident angles of all embodiments are no higher than 22°, therefore, it can ensure the necessary incident angle.

As mentioned above, the bifocus lens system not only can suppress the total length of the optical system but also can ensure the incident angle of the image side, thus it is particularly suitable for being used in the portable machine, such as the mobile phone and the like.

While we have shown and described various embodiments in accordance with the present invention, it should be clear to those skilled in the art that further embodiments may be made without departing from the scope of the present invention.

What is claimed is:

1. A bifocus lens system comprising: a first lens group, a second lens group at wide angle side, and a second lens group at telephoto side, wherein focal length is switched between a wide angle end and a telephoto end end by selectively replacing either of a combination of the first lens group and the second lens group at a wide angle side or the first lens group and the second lens group at a telephoto side on the optical axis, thus forming a bifocus lens assembly; either of the second lens groups has at least one aspherical surface and wherein the first lens group has at least one positive lens and at least one negative lens.

2. The bifocus lens system as claimed in claim 1, wherein either of the second lens groups has as least one plastic lens.

3. The bifocus lens system as claimed in claim 1, wherein a focal length of the first lens group is f1, a focal length of the second lens group at wide angle side is fw, and they satisfy the relation as: 1.0<f1/fw<1.4.

4. The bifocus lens system as claimed in claim 1, wherein a focal length of the second lens group at telephoto side is f2t, a total focal length of the whole lens groups at telephoto side is ft, they satisfy the relation: 0.8<|f2t/ft |<2.3.

5. A portable machine with bifocus lens system comprising a bifocus lens system having two focuses, wherein the bifocus lens system comprises a first lens group, a second lens group at wide angle side, and a second lens group at telephoto side, wherein focal length is switched between a wide angle end and a telephoto end by replacing either of a combination of the first lens group and the second lens group at a wide angle side or the first lens group and the second lens group at a telephoto side on the optical axis, thus forming a bifocus lens assembly; either of the second lens groups has at least one aspherical surface and wherein the first lens group has at least one positive lens and at least one negative lens.

6. The bifocus lens system as claimed in claim 5, wherein either of the second lens groups has as least one plastic lens.

7. The bifocus lens system as claimed in claim 5, wherein a focal length of the first lens group is f1, a focal length of the second lens group at wide angle side is fw, and they satisfy the relation as: $1.0 < f1/fw < 1.4$.

8. The bifocus lens system as claimed in claim 5, wherein a focal length of the second lens group at telephoto side is f2t, a total focal length of the whole lens groups at telephoto side is ft, they satisfy the relation: $0.8 < |f2t/ft| < 2.3$.

* * * * *